(12) United States Patent
Wang et al.

(10) Patent No.: US 9,287,593 B2
(45) Date of Patent: Mar. 15, 2016

(54) MULTI-TERMINAL BATTERY WITH SENSOR TERMINAL

(71) Applicant: EC POWER, LLC, State College, PA (US)

(72) Inventors: Chao-Yang Wang, State College, PA (US); Christian E. Shaffer, State College, PA (US); Puneet K. Sinha, State College, PA (US)

(73) Assignee: EC POWER, LLC, State College, PA (US)

( * ) Notice: Subject to any disclaimer, the term of this patent is extended or adjusted under 35 U.S.C. 154(b) by 131 days.

(21) Appl. No.: 14/189,904

(22) Filed: Feb. 25, 2014

(65) Prior Publication Data

US 2014/0295222 A1      Oct. 2, 2014

Related U.S. Application Data

(60) Provisional application No. 61/805,309, filed on Mar. 26, 2013.

(51) Int. Cl.
| | |
|---|---|
| *H01M 10/48* | (2006.01) |
| *H01M 10/42* | (2006.01) |
| *H01M 10/0525* | (2010.01) |
| *H01M 10/06* | (2006.01) |
| *H01M 10/34* | (2006.01) |

(52) U.S. Cl.
CPC .......... *H01M 10/486* (2013.01); *H01M 10/425* (2013.01); *H01M 10/0525* (2013.01); *H01M 10/06* (2013.01); *H01M 10/345* (2013.01); *Y02T 10/7011* (2013.01); *Y02T 10/7016* (2013.01)

(58) Field of Classification Search
CPC . H01M 10/48; H01M 10/482; H01M 10/425; H01M 10/4207; H01M 10/0525; H01M 10/486
See application file for complete search history.

(56) References Cited

U.S. PATENT DOCUMENTS

2011/0256444 A1 * 10/2011 Kaneta ................ H01M 2/0207
429/153
2012/0121939 A1      5/2012 Yoo
(Continued)

FOREIGN PATENT DOCUMENTS

| CN | 202145472 U | 2/2012 |
|---|---|---|
| CN | 102299294 B | 12/2013 |
| JP | 10-092476 A | 4/1998 |

(Continued)

OTHER PUBLICATIONS

International Search Report issued in International Application No. PCT/US2014/031760 dated Aug. 11, 2014.
(Continued)

*Primary Examiner* — Stewart Fraser
(74) *Attorney, Agent, or Firm* — McDermott Will & Emery LLP (57) ABSTRACT

A battery with three types of terminals is disclosed. The terminals include at least one negative terminal, at least one positive terminal, and at least one sensor terminal. The negative and positive terminals carry current during battery operation, while the sensor terminal is used to sense, communicate and/or control certain aspects of the battery. The sensor terminal can also be connected to external electronic units for sensing, communication and control of the battery usage.

20 Claims, 11 Drawing Sheets

(56) References Cited

U.S. PATENT DOCUMENTS

2012/0299555 A1* 11/2012 Tam ............... H01M 2/0212 320/162
2013/0196204 A1* 8/2013 Song ............... H01M 2/204 429/99

FOREIGN PATENT DOCUMENTS

| JP | 2012-256485 A | 12/2012 |
| KR | 10-2009-0120268 A | 11/2009 |
| WO | 2011151838 A1 | 12/2011 |

OTHER PUBLICATIONS

International Preliminary Report on Patentability dated Sep. 29, 2015, issued in corresponding International Application No. PCT/US2014/031760. 9 pgs.

* cited by examiner

MULTI-TERMINAL BATTERY WITH SENSOR TERMINAL

CROSS-REFERENCE TO RELATED APPLICATION

This application claims the benefit of U.S. Provisional Application No. 61/805,309 filed Mar. 26, 2013 the entire disclosure of which is hereby incorporated by reference herein.

TECHNICAL FIELD

The present invention relates generally to rechargeable batteries, and more particularly, to lithium-ion, lithium-polymer and nickel-metal hydride batteries for transportation and grid energy storage.

BACKGROUND

A rechargeable battery for electric vehicles and energy storage commonly has two terminals on its cap or cover. One is a positive terminal and the other is a negative terminal. Both terminals carry current during normal battery operation. Some recent references disclose multi-terminals in a battery. See, e.g., CN 202145472 U, CN 102299294 A, and WO/2011/151838. All of the terminals in the multi-terminal battery of these references carry electrical current during normal battery operation.

It is desirable that batteries for electric vehicles and grid-scale energy storage include sensing, diagnostics, and control capabilities. Thus, there is a need to develop and implement sensors integrated in battery cells during manufacturing that will offer sensing, communication and control capabilities, beyond traditionally measured current, voltage, and external temperature. There is a further need to develop a mass-producible, highly reliable cell construction allowing for multiple terminals.

SUMMARY OF THE DISCLOSURE

An advantage of the present disclosure is a multi-terminal battery including one or more sensor terminals. The sensor terminals can be connected to sensors embedded in the cell for either passive sensing or active diagnostics of the battery during operation or while the battery is intended to be static. Such a multi-terminal battery enables sensing, communication and control of the battery which can advantageously improve the performance, life and/or safety of the battery.

An additional advantage of the present disclosure is a battery management system including the multi-terminal battery with a sensor terminal. Such battery management system can be included in an electric vehicle or used to power any transportation vehicle or large capacity storage system.

These and other advantages are satisfied, at least in part, by a multi-terminal battery comprising: at least one negative terminal, at least one positive terminal and at least one sensor terminal wherein the negative and positive terminals are used to carry electrical current during normal charging and discharging operation of the battery and the sensor terminal does not carry such current but is used to sense, communicate and/or control certain aspects of the battery. The sensor terminal can advantageously detect, for example, a thermal, mechanical, chemical, electrical, temperature, gas pressure, voltage, stress or strain of the battery.

Embodiments of the present disclosure include wherein the battery is a rechargeable lithium ion, nickel-metal hydride, or lead-acid battery. Advantageously, the multi-terminal battery including the sensor terminal can be implemented in conventional battery designs having, for example, electrodes configured within the battery with a rolled electrode design or a stacked electrode design. The sensor terminal can be configured to detect the real-time internal temperature of the battery by connecting the sensor terminal to a probe at or near one or more electrodes of the battery.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

The present disclosure relates to a battery with multiple terminals. In accordance with the present disclosure, the multi-terminal battery includes at least one negative terminal, at least one positive terminal and at least one sensor terminal. The negative and positive terminals are used to carry electrical current that flows during the normal charging and discharging operation of the battery. The sensor terminal does not carry such current but is used to sense, communicate and/or control certain aspects of the operation of the battery.

Traditionally, rechargeable batteries included only two terminals, a positive and negative terminal, or two groups of such terminals, i.e., a group of positive terminals and a group of negative terminals. The two terminals were used to carry electrical current from electrodes (e.g. positive and negative) placed inside the battery cell. An advantage of the present disclosure is the addition of a third terminal or group of terminals that can be connected to sensors embedded in the cell for either passive sensing or active diagnostics of the battery during operation or while the battery is intended to be static. Such a multi-terminal battery enables sensing, communication and control of the battery and can improve the performance, life and/or safety of the battery.

Figure 1:
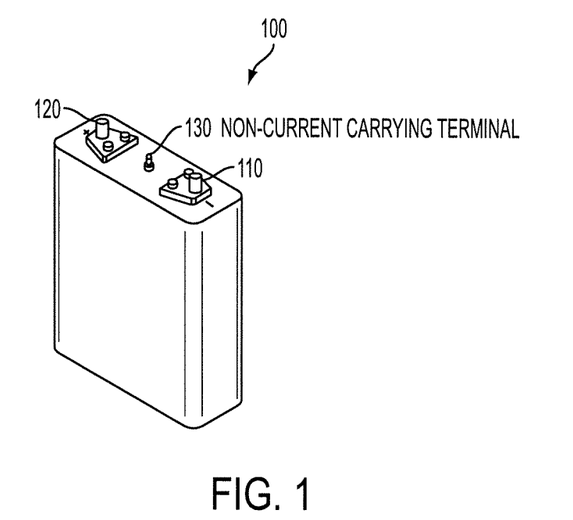
FIG. 1 illustrates a multi-terminal battery with positive, negative and sensing terminals.
Figure 2:
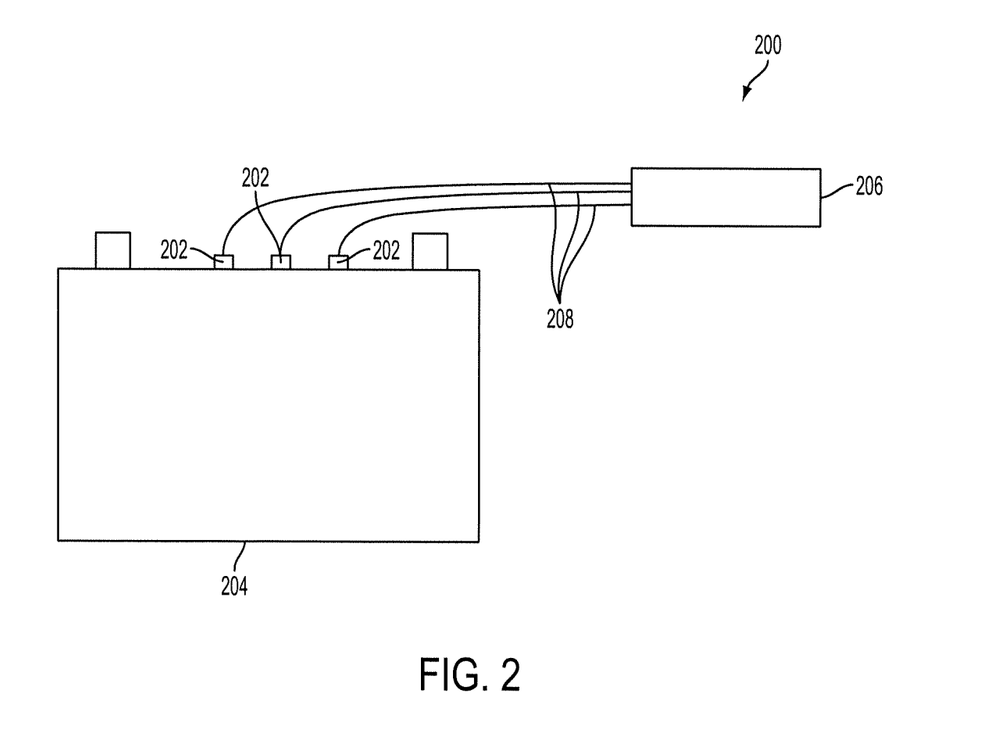
FIG. 2 illustrates a multiple terminal cell connected to battery management system electronics.
Figure 3:
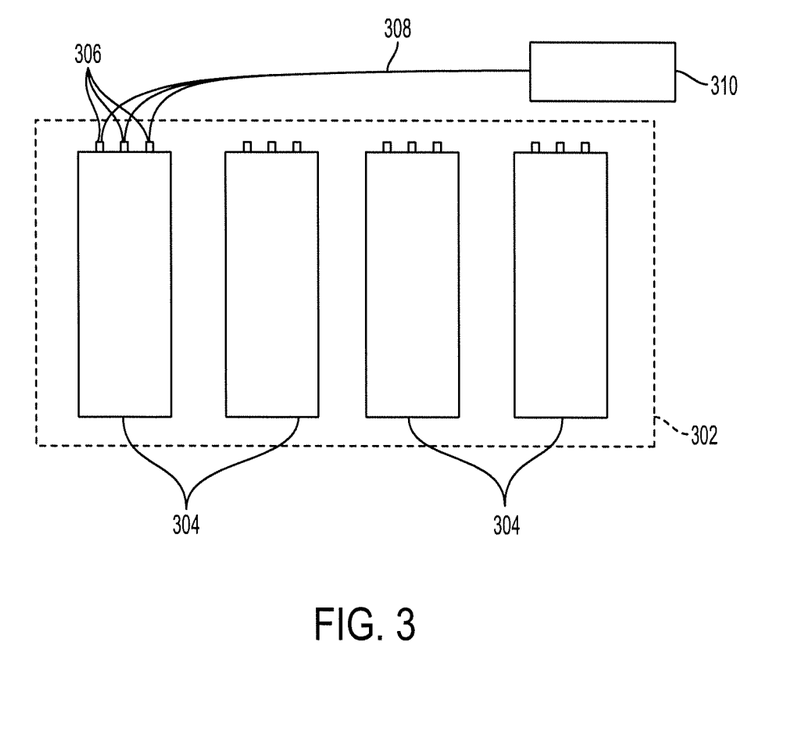
FIGS. 3 and 3a illustrate a battery pack having several multi terminal cells within the pack and the pack connected to battery management system electronics.

Advantageously, the multi-terminal battery including. the sensor terminal can be implemented in conventional batteries, such as rechargeable lithium ion, nickel-metal hydride, or lead-acid battery. The multi-terminal battery including the sensor terminal can be used with battery designs having, for example, electrodes configured within the battery with a rolled electrode design or a stacked electrode design. Further, the multi-terminal battery including the sensor terminal can be advantageously included in a battery management system. The sensor terminal of the battery can be connected to a controller in the battery management system to manage the battery. The connection between the sensor terminal of the multi-terminal battery and the controller can be by a physical connection, such as by a wire, or by a wireless connection such that the controller receives signal from the sensor terminal wirelessly. FIGS. 1 to 3 show how the multi-terminal battery including the sensor terminal can be implemented.

FIG. 1 illustrates an example of the multi-terminal battery of the present disclosure. As shown in FIG. 1, multiple terminals are provided on the cap of battery 100. For this example, the terminals are divided into three groups. One group includes negative terminals (110); another group includes positive terminals (120); and the third group includes the single sensing terminal (130). The first two groups carry current during charging and discharging operation of the battery. The third group does not carry current from the normal charging and discharging operation of the battery. The sensing terminal, 130, can be connected to interior sensors or probes embedded inside the battery cell. For example, the sensing terminal can include thermal, mechanical, chemical and electrical sensors, temperature sensors, gas pressure sensors, voltage sensors, stress and strain sensors, etc. The sensing terminal can also be connected to external electronic circuits for sensing, communication and control of the battery. Such a configuration is shown in FIGS. 2 and 3.

In one aspect of the present disclosure, the sensor terminals can be used as part of the battery management system. For example, as highlighted in FIG. 2, a multi-terminal battery of the present disclosure 200 can include a group of multiple sensor terminals 202 which can be used to carry signal from the same or different type of sensor embedded inside of battery cell 204. Sensor terminals 202 can be electrically connected to one ore more types of thermal, mechanical, chemical and electrical sensors, temperature sensors, gas pressure sensors, voltage sensors, stress and strain sensors, etc (not shown for illustrative convenience) inside battery cell 204. In this example, sensor terminals 202 are connected to battery management controller 206 which uses the signals from sensor terminals 202 to estimate certain aspects of battery performance, life and safety, e.g., state of charge and/or state of health. The sensor signals are carried from the sensor terminals 202 to the battery management controller 206, for example, through wires 208. The battery management controller typically uses the state of charge and/or state of health in its control algorithm to control the operation of the battery.

As an example of the operation of a multi-terminal battery of the present disclosure, one or more sensor terminals can be used as part of the safety management of the battery. For example, the sensor terminal can be used to detect, in more or less during the real time operation of the battery, the internal temperature, voltage, pressure, or stress/strain of the battery. Referring to FIG. 2, at a predetermined signal from one of sensor terminals (202), an internal safety device, such as an internal safety layer or material, can be activated and/or deployed to protect the battery from certain events. Such a safety device is well known in battery designs. Sensor terminals 202 can also be used to activate, either directly or through the battery management controller, a safety device external to the battery. Such an external cell mitigation strategy can include, but is not limited to, a device to decouple a cell from a pack, activating a specialized coolant spray, etc. The sensor terminal can also activate, either directly or through the battery management controller, safety devices internal to the battery, e.g., cell-internal materials or other internal safety devices within the battery as well. In addition, battery management controller 206 can take action such as shutting off the cell current or electrically isolating the cell when the signal from the sensor terminal reaches a certain level. Additionally, based on the reading from one or more of the sensor terminals (202), a battery management controller (206) can take action such as turning on or making active a cell-external safety device, such as a material to electronically and/or thermally isolate the cell, or a material or process that mitigates a safety event from occurring.

Figure 3A:
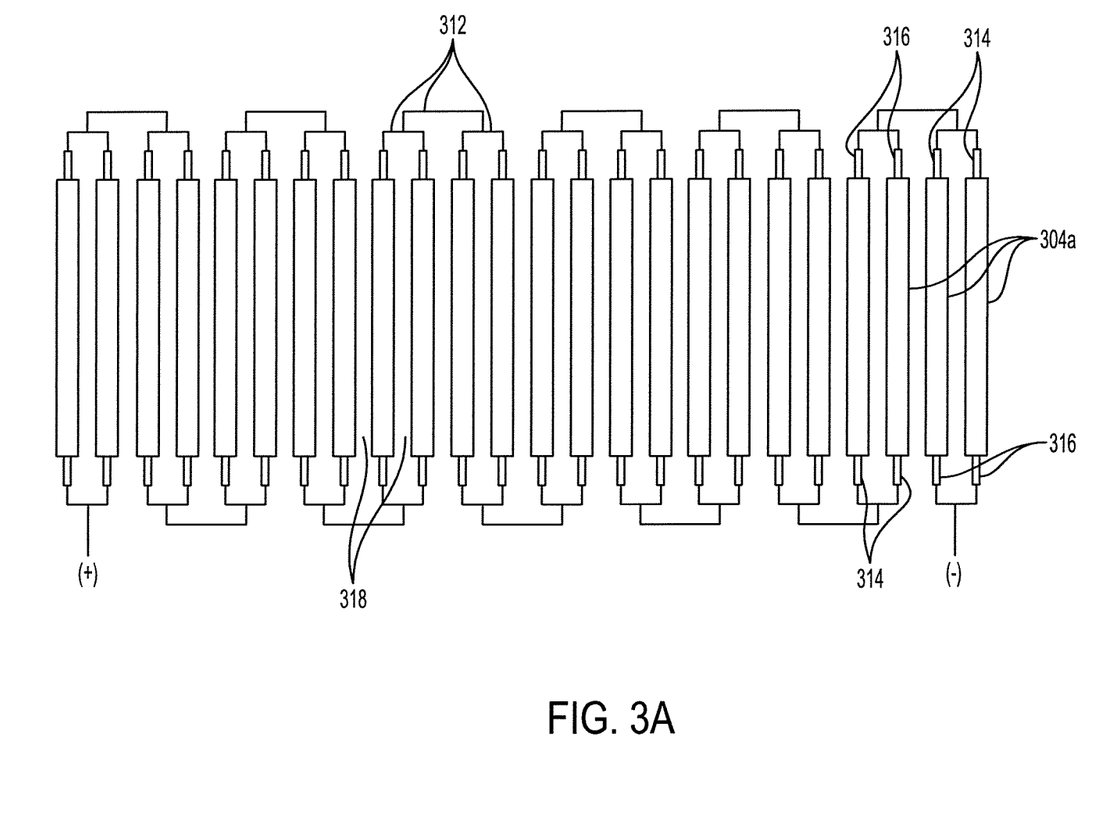

The multi-terminal battery of the present disclosure can be included as part of the powertrain system for an electric or hybrid electric vehicle. For example, a battery pack containing a plurality of multi-terminal batteries according to the present disclosure is illustrated in FIGS. 3 and 3(a). As shown in FIG. 3, battery pack 302 contains a plurality of multi-terminal battery cells 304 having a plurality of sensor terminals 306 inside of a battery pack 302. (Only the sensor terminals are showing in cells 304 of FIG. 3; the active terminals of cells 304 are shown in FIG. 3(a)). Sensor terminals 306 of battery cells 304 are electrically connected with wires 308 to battery management controller 310. Wires 308 carrying signals from sensor terminals 306 to the battery management controller 310. While the present example shows a physical connection between sensor terminals 306 and battery management controller 310, other ways of transmitting signal from the sensor terminal to the battery management controller can also be used. The plurality of sensor terminals 306 can be used to carry signals from the same or different type of sensor embedded inside of battery cells 304. Further, cells 304 can include different types of sensors embedded with the cell. Sensor terminals 306 can be electrically connected to one or more types of thermal, mechanical, chemical and electrical sensors, temperature sensors, gas pressure sensors, voltage sensors, stress and strain sensors, etc (not shown for illustrative convenience) inside battery cells 304. As described for FIG. 2 above, sensor terminals 306 and/or battery management controller 310 can initiate safety mitigation strategies that include safety devices internal and external to the battery cells or the pack as whole.

In a powertrain system, the battery pack acts as a partial or full propulsion device for the vehicle. The cells in the pack can be connected in some parallel and series combination (current carrying tabs are connected in this manner). FIG. 3(a) illustrates one example of how the current carrying tabs of a series of multi-terminal cells can be connected in a battery pack, e.g., a parallel and series combination. Specifically, FIG. 3(a) shows a 2 parallel, 12 series connection of cells 304a. Cells 304a are the same as cells 304 in FIG. 3 but show the active terminals of the cells. Here, the 24 cells 304a are connected by electronic conducting materials 312 (typically bus bars or other electrical conductors). The positive tabs 314 of the group of 2 cells in parallel are connected to the negative tabs 316 of the next parallel connected group of 2 cells in the 12 series string. In this example, there is air space 318 between cells 304a, where forced or natural convection cools or heats the cells 304a in the pack. In other examples, there may be cooling plates or other cooling devices in the location of 318.

In one aspect of the present disclosure, the battery management controller 310 can be part of a powertrain management controller and can detect, in more or less real-time operation of the battery, the reaction temperature of battery cells (304) when one or more of sensor terminals 306 is equipped with a temperature sensor probe within the cell. The battery management controller 310 can then take appropriate action, such as isolating the cell electronically and/or thermally, shutting down the cell operation, and/or activating internal safety devices within the cell, based on the temperature reading from the reaction temperature sensor surpassing a certain threshold level.

To better aid in understanding the versatility of the present disclosure, FIGS. 4-10, illustrate various designs for batteries having multiple negative and positive terminals for charging and discharging operations of a battery. These figures show various electrode designs and cap designs that can be implemented with the multi-terminal battery of the present disclosure. In addition, FIG. 11 illustrates a multi-terminal battery with a reaction temperature sensor as one type of sensor that can be used in various battery designs.

Figure 4:
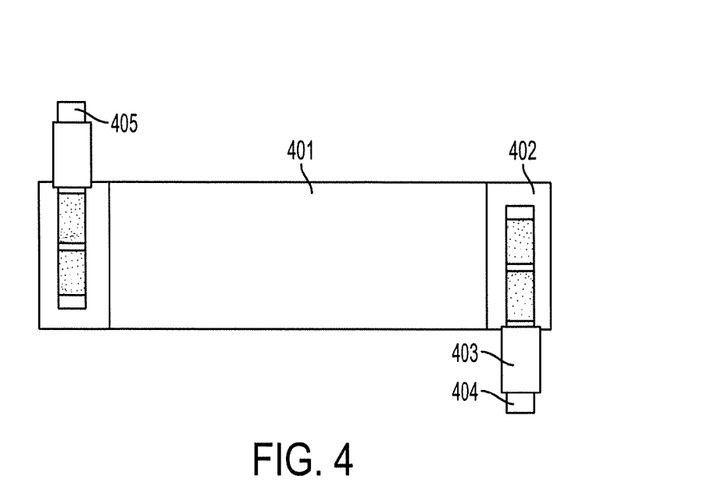
FIG. 4 shows a design for an electrode sheet segment with two terminals.

As is known in the art, a battery can be designed with multiple negative and positive terminals which are connected to anode and cathode electrode sheets within the battery. FIG. 4 shows a segment of an electrode sheet that includes a positive or negative current collector foil 402, active materials coated area 401 on the foil 402, and two tabs 404 and 405 welded onto the foil 402. The bottom portion of tab 404 is covered by an insulating film 403 such that various tabs inside the battery are insulated from one another.

Figure 5:
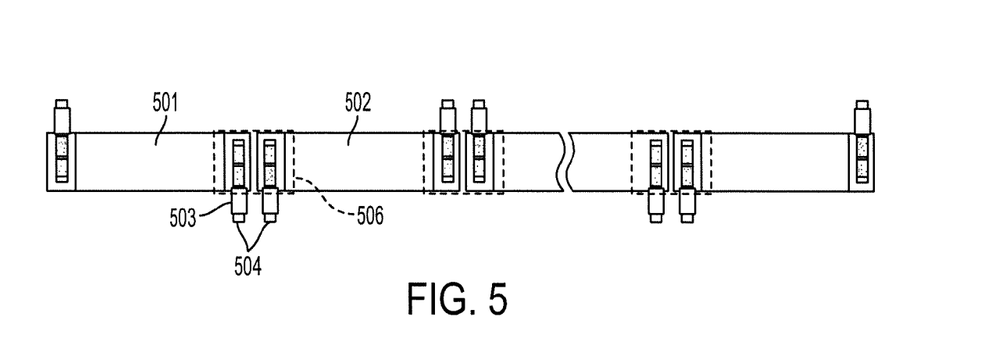
FIG. 5 shows a design for a series of electrode sheet segments connected by insulating tapes to form multiple sections with multiple tabs.

FIG. 5 shows a series of electrode sheet segments as described in FIG. 4 which are connected together by insulating film tapes. The insulating tape (506 marked by dashed lines in FIG. 5) connecting two neighboring segments 501 and 502 together. There is a small gap of roughly 1 mm between segments 501 and 502 in order to provide electrical insulation between the two segments. The two tabs (504) located in the connecting area under the insulating tape 506 of two neighboring segments 501 and 502 have the same orientation. There is also an insulating film 503 such that various tabs (504) inside the battery are insulated from one another. Tabs 504 can be connected in various manners to the active battery terminals of a multi-terminal battery. For example, there may be the same number of tabs as active terminals, wherein each one tab (504) is connected to one active terminal. In another example, multiple tabs (504) may be connected to one active cell terminal with or without some resistance material between the connected tabs.

Figure 6:
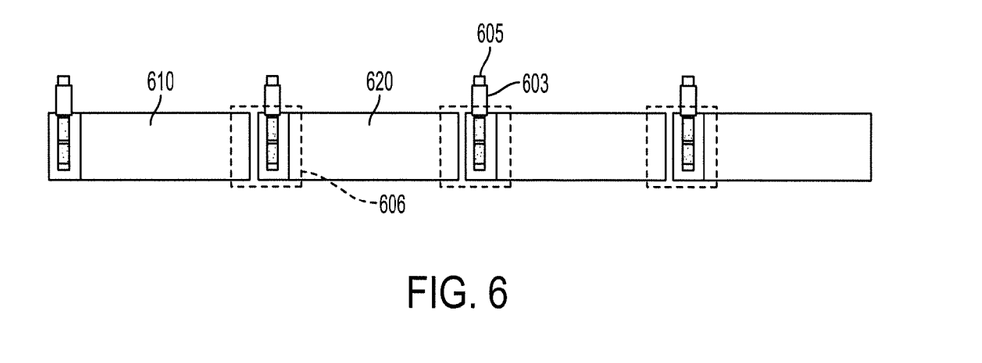
FIG. 6 shows another design of electrode sheet segments connected together to form multiple sections with multiple tabs.

FIG. 6 displays another design connecting various electrode sheet segments with only one tab 605 for each segment. Each tab 605 has an insulating film 603 such that various tabs 605 inside the battery are electronically insulated from one another. Area 606 indicates how segment 610 is taped by an insulating film 606 to segment 620. There is an approximately 1 mm gap between the two segments for electrical insulation. All tabs are oriented in the same direction. The tabs 605 can be connected in various manners to the active battery terminal(s). For example, there may be the same number of tabs as active terminals, wherein each one tab 605 is connected to one active terminal. In another example, multiple tabs 605 may be connected one active cell terminal with or without some resistance material between the connected tabs.

Figure 7A:
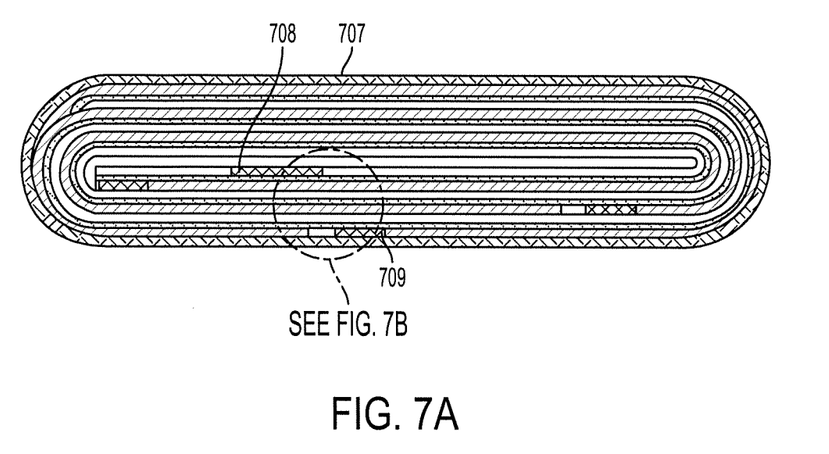
FIGS. 7(a) to 7(c) illustrate a rolled electrode design for a multi-terminal battery.
Figure 7B:
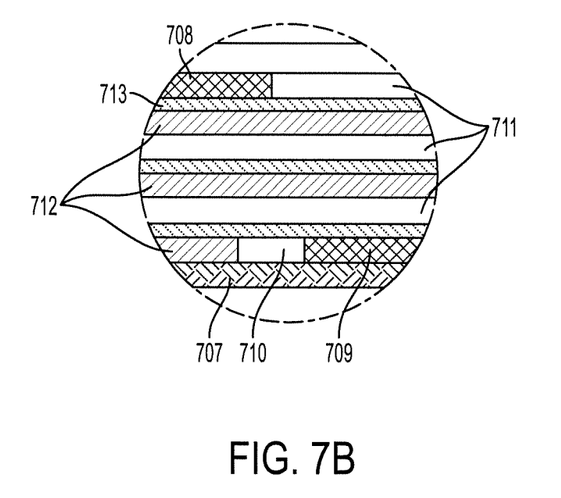
Figure 7C:
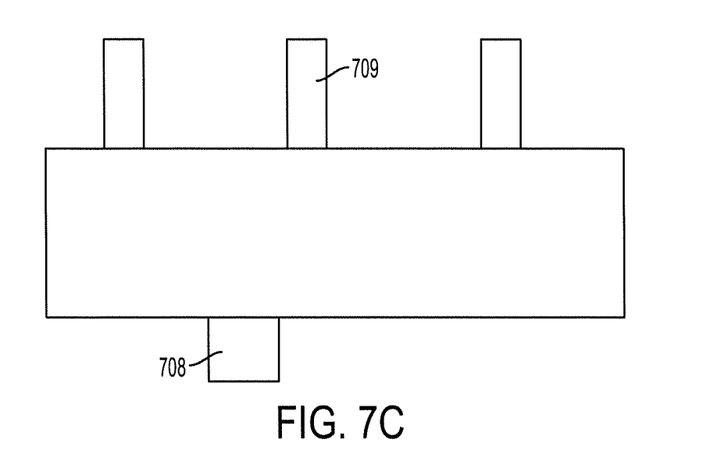

FIGS. 7(a) to 7(c) show another design of segmented cell with multiple terminals where the negative electrode sheet 711 is continuous with only one tab 708. The positive electrode sheet 712 is however segmented into several pieces (only three pieces are shown here for illustration), with each positive electrode segment piece equipped with one tab such as 709. The gap 710 exists between two neighboring segments on the positive sheet to ensure that the segments are insulated from each other. The negative sheet 711, separator 713, and the positive electrode sheet 712 are then wound together to form a flat jelly-roll which can then be inserted in a metal case 707. Multiple tabs coming out of the electrode sheets are fully covered by insulating films and then welded to multiple terminals mounted on the battery cap. The multiple positive tabs (709) can be connected in various manners to the active battery terminal(s). For example, there may be the same number of tabs as active terminals, wherein each one tab (709) is connected to one active terminal. In another example, multiple tabs (709) may be connected one active cell terminal with or without some resistance material between the connected tabs. The battery is then sealed similarly by conventional methods.

Figure 8A:
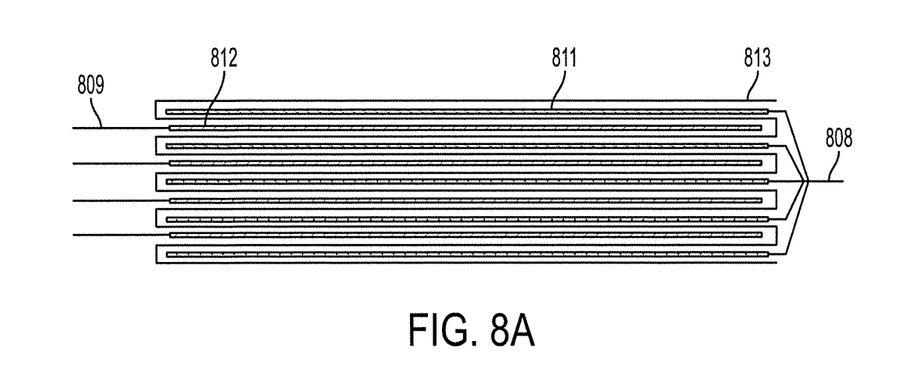
FIGS. 8(a) and 8(b) show a stacked electrode design for a multi-terminal battery.
Figure 8B:
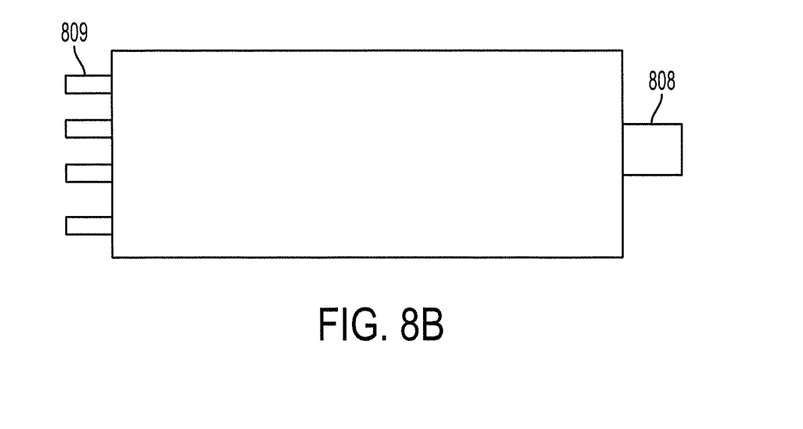

A battery with multiple positive terminals and a negative terminal can also be used in the present disclosure. FIGS. 8(a) and 8(b) show a design that includes stacked electrode sheets that can be used in such a battery. For example, multiple sheets of negative electrodes 811 and positive electrodes 812 are stacked with separator 813 in between. All negative sheets are welded together onto a single negative tab 808, while the positive sheets are kept separate and each is connected to an outside terminal (e.g. 809). Thus, this battery has multiple positive terminals and one negative terminal. The terminal tabs are thermally sealed between aluminum packaging materials, similarly to manufacture of conventional batteries with one positive and one negative terminal. Other steps of cell formation, gassing and final sealing remain the same as in manufacture of conventional pouch cells.

Figure 9A:
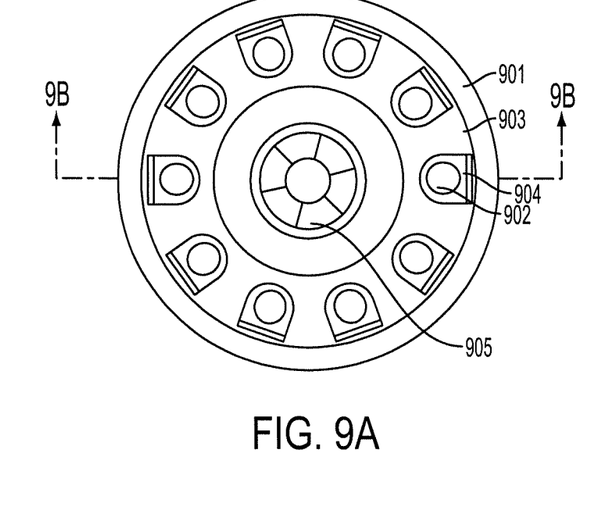
FIGS. 9(a) to 9(c) illustrate a cap design for a multi-terminal cylindrical battery cell.
Figure 9B:
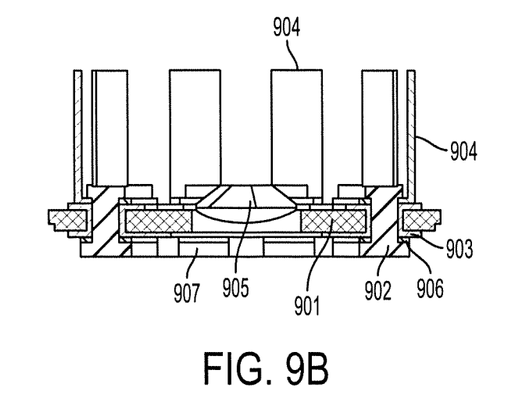
Figure 9C:
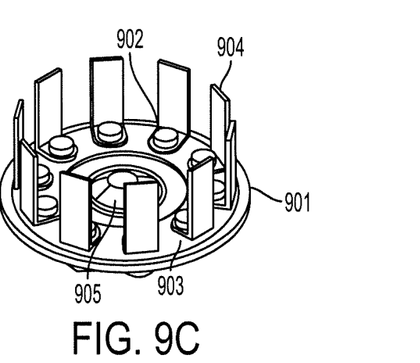
Figure 10:
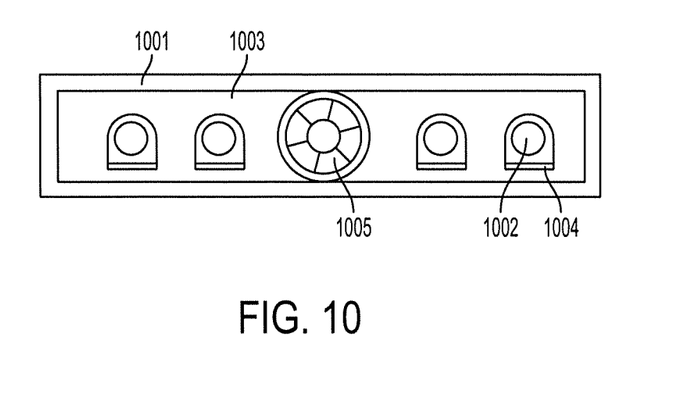
FIG. 10 illustrates a rectangular cap design for a multi-terminal rectangular hard-case battery.
Figure 11:
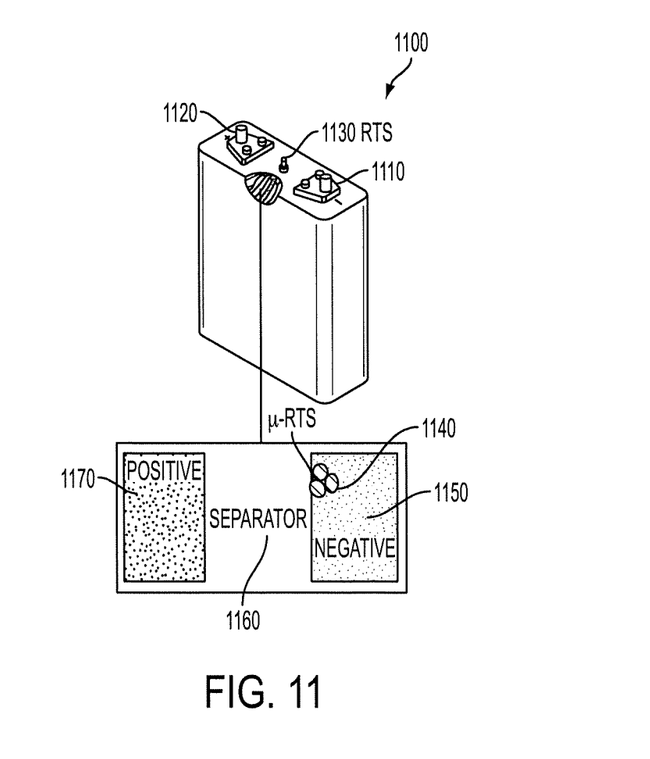
FIG. 11 illustrates a multi-terminal battery having a reaction temperature sensor (RTS) which is used to measure temperature at the electrochemical interface between active materials and electrolyte inside the cell.

Two examples of how to construct multiple terminals on a battery cap or cover are shown in FIGS. 9 and 10, respectively, for a cylindrical and a rectangular hard-case cell. The multi-terminal batteries of the present disclosure can contain a continuous or segmented current collector for the anode or cathode electrodes. FIGS. 9(a) to 9(c) show a cap with 10 terminals. Each terminal includes rivet 902 and sealing washer 904. The cap 901 can be made of various metals such as an aluminum disk of about 2-3 mm in thickness. Evenly distributed over the cap are 10 aluminum rivets (902) of diameter about 4 mm. There is an insulating layer 903 between rivets 902 and the cap base 901. Thus, all 10 terminals are electrically separate from each other. The insulating layer preferably is made of ageing-resistant, corrosion-resistant elastic materials. Sealing washers 904 and 906 can be used between the terminal rivet 902 and the cap base 901. These washers are made of a steel alloy or Ni-coated steel material with good mechanical strength. By pressing the two washers, the cap base 901, insulating layer 903 and terminal rivet 902 are sealed gas-tight. The upper washer 904 can be further extended outside as a tab for easy connection with external circuits. The extension portion of washer 904 can be designed with appropriate width and thickness in order to accommodate the operating current range without incurring excessive resistance and hence ohmic heating. The cap can include one or more venting valves (905) on the cap for safety. The 10 terminals shown can be used either as active terminals (negative or positive), or non-active sensor terminals. In the case of a non-active sensor terminal the internal sensor's wires or connectors are welded to the internal (bottom) side of the rivet 902, as indicated by location 907. In the case of an active terminal, there is a wire or electronic connection that is welded on one side to the rivet 902 at location 907, and on the other side to the tab(s) from the segmented sections.

FIGS. 10 displays a cap design for a rectangular hard-case battery where four terminals are constructed in the same way as for the cylindrical battery shown in FIG. 9. FIG. 8 shows a cap with 4 terminals made of rivets 1002 and washers 1004. The cap 1001 can be made of various metals. For this example cap 1001 is made of a rectangular aluminum sheet of about 2-3 mm in thickness. Distributed over the cap are 4 aluminum rivets 1002 of diameter about 4 mm. These rivets are part of the 4 terminals. There is an insulating layer 1003 between rivets 1002 and the cap base 1001. Thus, all 4 terminals are electrically separate from each other. The insulating layer can be made of ageing-resistant, corrosion-resistant elastic materials. The sealing washers, manner in which the rivet is connected to the cap, etc. are the same as provided in FIG. 9 for the cylindrical cap. There can exist one or more venting valves (1005) on the cap for safety. The 4 terminals shown can be used either as active terminals (negative or positive), or non-active sensor terminals. In the case of a non-active sensor terminal the internal sensor's wires or connectors are welded to the internal (bottom) side of the rivet 1002. In the case of an active terminal, there is a wire or electronic connection that is welded on one side to the rivet 1002, and on the other side to the tab(s) from the segmented sections.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

FIG. 11 illustrates an example of a multi-terminal battery (1100) including a group of negative terminals (1110), a group of positive terminals (1120) and a sensor terminal (1130). The sensor terminal in this example detects the temperature within a rechargeable battery, e.g., a lithium ion battery. The sensor in this example includes probe 1140 which is connected to terminal 1130 by a wire (not shown). Probe 1140 is embedded at the electrochemical interface between active materials of the electrode and the electrolyte of multi-terminal battery (1100). In this example, probe 1140 is embedded in the negative electrode 1150 at the interface of the negative electrode and separator 1160. Alternatively, the probe could be embedded in positive electrode 1170 at the electrode separator interface. The temperature probe connected to the sensor terminal can be made either of micron-sized thermocouples or thin-film thermistors, and placed either at the anode electrode-separator interface or cathode electrode-separator interface. This sensor terminal thus configured can detect the reaction temperature at the electrochemical interface and thus the health and safety states of the battery can be closely monitored during the real-time operation of the battery.

In one specific example, several T-type micro thermocouples with bead diameter of 30 µm and wire diameter of 100 µm (including the insulation outer layer) were used as probes in Li-ion battery. These thermocouple beads were mixed with active material powders and coated onto a copper foil to form an anode sheet. The anode sheet was then sandwiched with a separator and a regular cathode sheet to wind into a cylindrical jelly roll of 18650 cell size. These micro thermocouples were located between the anode and separator interface and distributed over various radii of the jelly roll. The jelly roll was then inserted into a standard can and manufactured into a battery cell using conventional processes. The thermocouple wires were connected to the sensing terminals on the battery cap that were constructed following methods described above.

Figure 12:
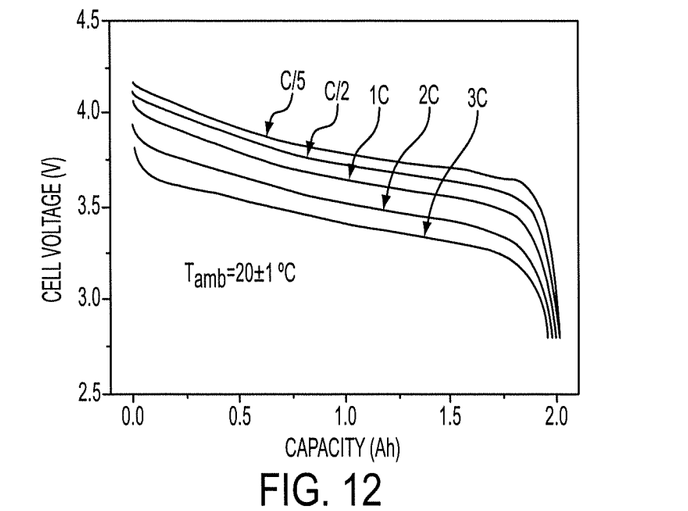
FIG. 12 shows discharge voltage curves at various rates of a multi-terminal 18650 battery cell equipped with a temperature sensor.
Figure 13:
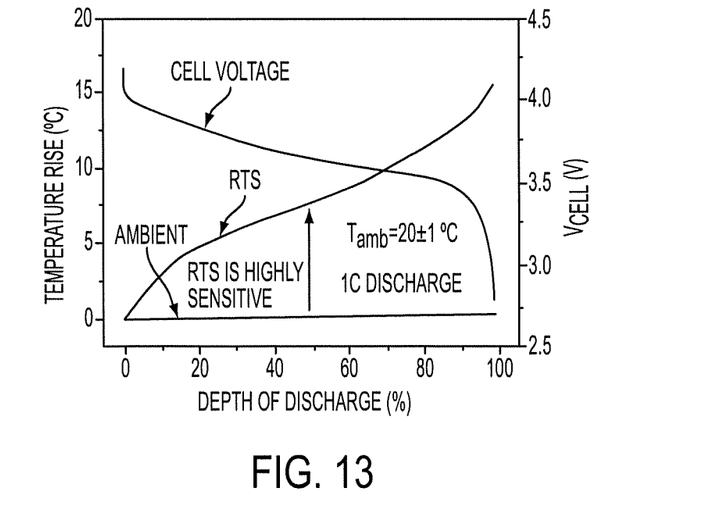
FIG. 13 is a graph showing the rise in the measured reaction temperature above an initial 20° C. cell temperature from a reaction temperature sensor (RTS) within a multi-terminal 18650 battery cell undergoing discharge at 1 C rate.

FIG. 12 shows a series of discharge results of such a multi-terminal battery equipped with reaction temperature sensors (RTS) for various C-rates. The tests were carried out with the battery located in an environmental chamber where the ambient temperature is well controlled at 20 deg C. The discharge performance is seen to resemble a regular 2-terminal battery without RTS sensing terminal, demonstrating no disturbance in performance due to the presence of RTS manufactured accordingly to the presently disclosed method. FIG. 13 shows temperature reading of one RTS located in the inner center of the jelly roll, along with the cell voltage and ambient temperature curves. It is seen that while the ambient temperature hardly changes, the reaction temperature at the electrochemical interface rises strongly with battery discharge, providing a very sensitive indicator of the internal state of the battery.

Figure 14:
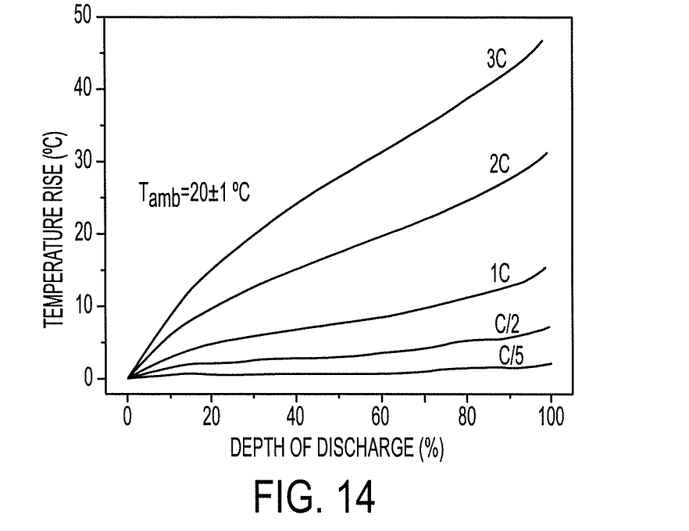
FIG. 14 is a graph showing the rise in the reaction temperature above an initial 20° C. cell temperature for discharge rates of C/5, C/2, 1C, 2C, and 3C in an 18650 battery cell equipped with a reaction temperature sensor.
Figure 15:
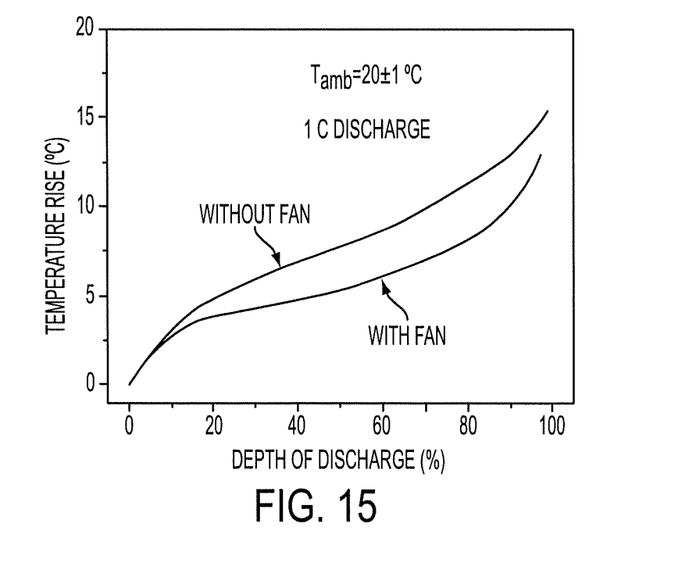
FIG. 15 is a graph showing the sensitivity of reaction temperature to ambient cooling conditions; the cell being cooled with a fan, and without a fan.
Figure 16:
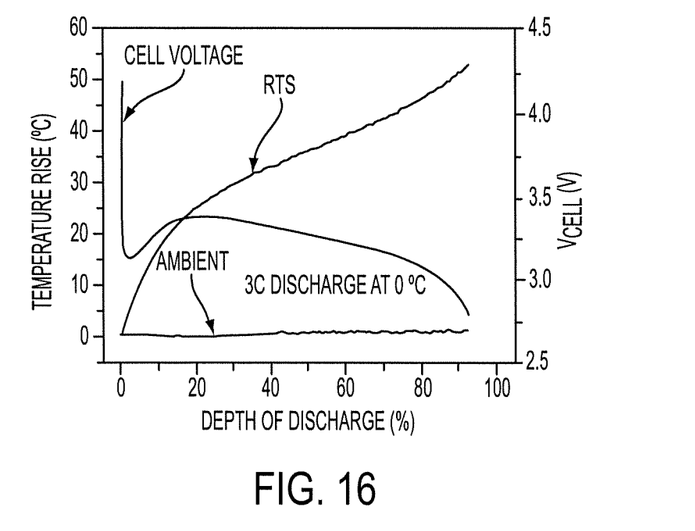
FIG. 16 is a graph showing the rise in reaction temperature of an 18650 battery cell during discharge starting from 0° C., and the simultaneously measured voltage response of the same battery cell.

FIG. 14 shows the excellent sensitivity of RTS to the battery discharge rate. As expected, the higher the discharge rate, the more temperature rise is detected. FIG. 15 further shows that the RTS can clearly detect and distinguish the battery external cooling condition, i.e. with and without fan. Finally, FIG. 16 shows the effectiveness of RTS when the multi-terminal battery is operated at low temperatures, i.e. at the freezing point.

All of the above-described experiments thus demonstrate that the present multi-terminal battery equipped with RTS offers valuable additional information to monitor the internal state of the battery, thereby enabling significant improvements in battery performance, safety and life.

A multi-terminal battery with a micro-probe embedded inside the battery cell to measure real-time reaction temperature at the electrochemical interface between active material particles and the electrolyte provides early detection and prevention of possible internal faults, thus significantly enhancing battery safety. While the test results are shown for a Li-ion battery, similar effectiveness of the present multi-terminal battery for nickel-metal hydride (Ni—MH) and lead-acid batteries is expected.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A multi-terminal battery comprising: at least one negative terminal, at least one positive terminal and at least one sensor terminal which is electrically connected to a probe within a cell of the battery, wherein the negative and positive terminals are used to carry electrical current during normal charging and discharging operation of the battery and the sensor terminal does not carry said electrical current during normal charging and discharging operation of the battery.

2. The multi-terminal battery of claim 1, wherein the battery is a rechargeable lithium ion, nickel-metal hydride, or lead-acid battery.

3. The multi-terminal battery of claim 1, wherein the sensor terminal detects a thermal, mechanical, chemical, electrical, temperature, gas pressure, voltage, stress or strain of the battery.

4. The multi-terminal battery of claim 1, wherein the sensor terminal is connected to a controller to manage the battery.

5. The multi-terminal battery of claim 1, wherein the at least one negative terminal and at least one positive terminal are connected to multiple tabs welded onto one or more electrode sheet segments within the battery.

6. The multi-terminal battery of claim 5, wherein each segment of the one or more electrode sheet segments has one or two tabs welded onto it.

7. The multi-terminal battery of claim 5, wherein the one or more electrode sheets are constructed either in a rolled electrode design or a stacked electrode design.

8. The multi-terminal battery of claim 1, wherein the terminals comprise corrosion-resistant metal rivets with an insulation layer placed between each rivet and a cap base.

9. The multi-terminal battery of claim 8, wherein metal washers comprising a steel alloy are positioned underneath the metal rivets to seal the metal rivets to the cap.

10. The multi-terminal battery of claim 1, wherein the sensor terminal detects the reaction temperature at an electrochemical interface between active material particles and an electrolyte of the battery.

11. The multi-terminal battery of claim 10, wherein the probe comprises either micron-sized thermocouples, thin-film thermistors, or thin film thermocouples for detecting a temperature of the battery.

12. The multi-terminal battery of claim 11, wherein the probe is part of active electrode material of a cell of the battery or taped onto a surface of an electrode of the battery.

13. The multi-terminal battery of claim 11, wherein the probe is located between an anode layer and separator, or between a cathode layer and separator, or internally within either or both the anode and cathode.

14. The multi-terminal battery of claim 11, wherein the probe is distributed along different radius direction in a rolled electrode design or within different layers of a stacked electrode design.

15. A battery management system including a multi-terminal battery of claim 1.

16. The battery management system of claim 15, further comprising a battery management controller connected to the sensor terminal of the battery.

17. The battery management system of claim 16, wherein the battery management controller can activate a safety device within the battery.

18. The battery management system of claim 16, wherein the battery management controller can activate a safety device external to the battery.

19. The battery management system of claim 16, wherein the battery management controller can monitor the state of charge or state of health of the battery.

20. A powertrain system for electric and hybrid-electric vehicles that contains the battery management system of claim 15.

* * * * *